(12) United States Patent
Wang et al.

(10) Patent No.: US 12,250,173 B2
(45) Date of Patent: Mar. 11, 2025

(54) METHOD FOR REFERENCE SIGNAL CONFIGURATION

(71) Applicant: ZTE CORPORATION, Guangdong (CN)

(72) Inventors: Yuxin Wang, Shenzhen (CN); Hao Wu, Shenzhen (CN); Zhaohua Lu, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 389 days.

(21) Appl. No.: 17/848,938

(22) Filed: Jun. 24, 2022

(65) Prior Publication Data
US 2022/0321302 A1 Oct. 6, 2022

Related U.S. Application Data

(63) Continuation of application No. PCT/CN2020/075392, filed on Feb. 14, 2020.

(51) Int. Cl.
*H04L 5/00* (2006.01)
*H04W 72/02* (2009.01)
*H04W 72/04* (2023.01)
*H04W 72/0446* (2023.01)
*H04W 72/0453* (2023.01)

(52) U.S. Cl.
CPC ........... *H04L 5/0051* (2013.01); *H04W 72/02* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2018/0048498 | A1 | 2/2018 | Stern-Berkowitz et al. |
| 2019/0103949 | A1 | 4/2019 | Harrison et al. |
| 2019/0174466 | A1 | 6/2019 | Zhang et al. |
| 2019/0281588 | A1 | 9/2019 | Zhang et al. |
| 2020/0028638 | A1 | 1/2020 | Liu et al. |
| 2022/0216963 | A1* | 7/2022 | Chen ............... H04L 5/0023 |
| 2023/0030823 | A1* | 2/2023 | Wang ............... H04L 5/0005 |

FOREIGN PATENT DOCUMENTS

| | | |
|---|---|---|
| CN | 109803362 A | 5/2019 |
| CN | 109923828 A | 6/2019 |
| CN | 110099446 A | 8/2019 |

(Continued)

OTHER PUBLICATIONS

Extended European Search Report for EP Appl. No. 20890196.7, dated Nov. 10, 2022 (10 pages).

(Continued)

*Primary Examiner* — Hong Shao
(74) *Attorney, Agent, or Firm* — Foley & Lardner LLP

(57) ABSTRACT

Wireless communication method, systems and devices for reference signal configuration. The wireless communication method comprises configuring, to a wireless terminal, at least one first sounding reference signal (SRS) resource set, and receiving, from the wireless terminal, at least one first SRS based on the at least one SRS resource set, wherein each of the at least one SRS resource set comprises at least one SRS resource.

14 Claims, 3 Drawing Sheets

(56) References Cited

FOREIGN PATENT DOCUMENTS

CN 110324124 A 10/2019
WO WO-2019/068643 A1 4/2019

OTHER PUBLICATIONS

Huawei et al., "Enhancements for single UL operation for EN-DC", 3GPP TSG RAN WG1 Meeting #96bis, R1-1903994, Apr. 12, 2019, Xi'an, China (7 pages).
Huawei et al., "Remaining details of SRS design", 3GPP TSG RAN WG1 Meeting #91, R1-1719441, Dec. 1, 2017, Reno, USA (12 Pages).
Notice of Grounds of Rejection for JP Appl. No. 2022-540568, dated Nov. 14, 2023 (with English translation, 6 pages).
Vivo, "Discussion on UL RS for NR positioning", 3GPP TSG RAN WG1 #98, R1-1908175, Aug. 30, 2019, Prague, CZ (9 pages).
Huawei et al., "UL SRS design for beam management and CSI acquisition" 3GPP TSG RAN WG1 NR Ad Hoc Meeting, R1-1709936, Jun. 30, 2017, Qingdao, China (8 pages).
International Search Report and Written Opinion for PCT Appl. No. PCT/CN2020/075392, mailed Nov. 30, 2020 (8 pages).
Oppo, "Further discussion on SRS design for NR" 3GPP TSG RAN WG1 Meeting #91, R1-1719967, Nov. 27, 2017, Reno, USA (5 pages).
First Office Action for CN Appl. No. 202080090175.X, dated May 25, 2024 (with English translation, 20 pages).
Sony, "Summary of SRS", 3GPP TSG RAN WG1 Meeting #93, R1-1807602, May 25, 2018, Busan, Korea (57 pages).

\* cited by examiner

METHOD FOR REFERENCE SIGNAL CONFIGURATION

CROSS-REFERENCE TO RELATED APPLICATION

This application claims the benefit of priority under 35 U.S.C. § 120 as a continuation of PCT Patent Application No. PCT/CN2020/075392, filed on Feb. 14, 2020, the disclosure of which is incorporated herein by reference in its entirety.

TECHNICAL FIELD

This document is directed generally to wireless communications.

BACKGROUND

In long-term evolution (LTE), a physical downlink (DL) control channel (PDCCH) is utilized to carry DL control information (DCI), wherein the DCI may comprises uplink (UL)/DL scheduling message(s) and UL power control information. There are different DCI formats, such as DCI format 0, 1, 1A, 1B, 1C, 1d, 2, 2A, 3, 3A. In LTE-advanced (LTE-A) release 12, DCI formats 2B, 2C and 2D are added for supporting various applications and transmission modes. Via the DCI, a communication node (e.g. an evolved node B (eNB)) is able to configure a communication terminal device (e.g. a user equipment (UE)). Or, the communication terminal device may be configured by higher layers (i.e. the communication terminal device is configured via higher layer signaling).

Sounding reference signal (SRS) is a signal used for measuring channel state information (CSI) of a channel between the communication node and the communication terminal device. In the LTE system, the communication terminal device regularly transmits a UL SRS on the last data symbol of a sub-frame based on parameters (e.g. frequency band, frequency domain position, sequence cyclic shift, period, sub-frame offset, . . . , etc.) indicated by the communication node. The communication node determines CSI of UL channels of the UE based on the received STS and performs operations (e.g. frequency selection scheduling and close-loop power control) according to the determined CSI.

According to LTE release 10, non-precoding SRS(s) should be used in UL communications (i.e. antenna dedicated SRS) and de-modulation reference signal (DMRS) of a physical UL shared channel (PUSCH) should perform precoding. By receiving the non-precoding SRS, the communication node is able to estimate original CSI, which cannot be acquired based on the precoding DMRS. Under such a condition, the communication terminal device may require more SRS resources when using multiple antennas to transmit non-precoding SRSs, resulting in the number of communication terminal devices simultaneously multiplexing in the system decreasing. The communication terminal device may transmit the SRS configured by the higher layer signaling (type-0 trigger) or the DCI (type-1 trigger). The SRS transmissions configured by the higher layer signaling are periodic and the SRS transmissions configured by the DCI are aperiodic. Because LTE-A release 10 adds the aperiodic SRS, a utilization of the SRS resources and a flexibility of scheduling the SRS are improved to some extent.

According to new radio (NR) release 15, usages of the SRS are classified into 4 categories: beam management, codebook based, non-codebook-based, and antenna switching.

SUMMARY

This document relates to methods, systems, and devices for configuring a reference signal, and more particularly for configuring a sounding reference signal.

The present disclosure relates to a wireless communication method for use in a wireless network node. The wireless communication method comprises:
  configuring, to a wireless terminal, at least one first sounding reference signal, SRS, resource set, and
  receiving, from the wireless terminal, at least one first SRS based on the at least one SRS resource set,
  wherein each of the at least one SRS resource set comprises at least one SRS resource.

Various embodiments may preferably implement the following features:

Preferably, the at least one SRS resource comprises at least one first SRS resource in which the wireless network node receives the at least one first SRS from the wireless terminal.

Preferably, the at least one SRS resource comprises at least one second SRS resource in which the wireless network node does not receive the at least one first SRS from the wireless terminal.

Preferably, the wireless network node does not receive the at least one first SRS from the wireless terminal in the at least one second SRS resource based on at least one time parameter.

Preferably, the at least one time parameter comprises a period and the wireless network node does not receive the at least one first SRS from the wireless terminal in the at least one second SRS resource every the period.

Preferably, the period is determined based on a period of transmitting the at least one first SRS for a first network and a period of transmitting at least one second SRS for a second network.

Preferably, one of the at least one second SRS resource is selected for receiving the at least one first SRS and the number of times of SRS transmissions increases.

Preferably, one of the at least one second SRS resource is selected for receiving the at least one first SRS and the number of times of SRS transmissions keeps the same.

Preferably, the at least one SRS resource comprises at least one third SRS resource which comprises at least one resource parameter, wherein the at least one resource parameter indicates at least one resource in which the wireless network node receives the at least one first SRS from the wireless terminal and at least one resource in which the wireless network node does not receive the at least one first SRS from the wireless terminal.

Preferably, the at least one SRS resource comprises a dividing parameter for determining a length for each of the at least one first SRS.

Preferably, the length of each of the at least one first SRS is determined by dividing, by the dividing parameter, at least one physical resource block, PRB, configured for each of the at least one first SRS into a plurality of PRB segments.

Preferably, wherein the at least one first SRS is in one of the plurality of PRB segments.

Preferably, the at least one SRS resource comprises an offset parameter configured to indicate the one of the plurality of PRB segments for each of the at least one first SRS.

Preferably, the offset parameter is configured via a radio resource control, RRC, signaling.

Preferably, the dividing parameter is configured via an RRC signaling.

The present disclosure relates to a wireless communication method for use in a wireless terminal. The wireless communication method comprises:

receiving, from a wireless network node, a configuration of at least one first sounding reference signal, SRS, resource set, and transmitting, to the wireless network node, at least one first SRS based on the at least one SRS resource set, wherein each of the at least one SRS resource set comprises at least one SRS resource.

Various embodiments may preferably implement the following features:

Preferably, the at least one SRS resource comprises at least one first SRS resource in which the wireless terminal transmits the at least one first SRS to the wireless network node.

Preferably, the at least one SRS resource comprises at least one second SRS resource in which the wireless terminal does not transmit the at least one first SRS to the wireless network node.

Preferably, the wireless terminal does not transmit the at least one first SRS to the wireless network node in the at least one second SRS resource based on at least one time parameter.

Preferably, the at least one time parameter comprises a period and the wireless terminal does not transmit the at least one first SRS to the wireless network node in the at least one second SRS resource every the period.

Preferably, the period is determined based on a period of transmitting the at least one first SRS for a first network and a period of transmitting at least one second SRS for a second network.

Preferably, one of the at least one second SRS resource is selected for transmitting the at least one first SRS and the number of times of SRS transmissions increases.

Preferably, one of the at least one second SRS resource is selected for transmitting the at least one first SRS and the number of times of SRS transmissions keeps the same.

Preferably, the at least one SRS resource comprises at least one third SRS resource which comprises at least one resource parameter, wherein the at least one resource parameter indicates at least one resource in which the wireless network node receives the at least one first SRS from the wireless terminal and at least one resource in which the wireless network node does not receive the at least one first SRS from the wireless terminal.

Preferably, wherein the at least one SRS resource comprises a dividing parameter for determining a length of each of the at least one first SRS Preferably, the length of each of the at least one first SRS is determined by dividing, by the dividing parameter, at least one physical resource block, PRB, configured for each of the at least one first SRS into a plurality of PRB segments.

Preferably, wherein the at least one first SRS is in one of the plurality of PRB segments.

Preferably, the at least one SRS resource comprises an offset parameter configured to indicate the one of the plurality of PRB segments for each of the at least one first SRS.

Preferably, the offset parameter is configured via a radio resource control, RRC, signaling.

Preferably, the dividing parameter is configured via an RRC signaling.

The present disclosure relates to a wireless network node comprising:

a processor, configured to configure, to a wireless terminal, at least one first sounding reference signal, SRS, resource set, and a communication unit, configured to receive, from the wireless terminal, at least one first SRS based on the at least one SRS resource set.

Various embodiments may preferably implement the following feature:

Preferably, the processor is further configured to perform a wireless communication method recited in any of the foregoing described methods.

The present disclosure relates to a wireless terminal, comprising a communication unit, which is configured to:

receive, from a wireless network node, a configuration of at least one first sounding reference signal, SRS, resource set, and transmit, to the wireless network node, at least one first SRS based on the at least one SRS resource set, wherein each of the at least one SRS resource set comprises at least one SRS resource.

Various embodiments may preferably implement the following feature:

Preferably, the wireless terminal further comprises a processor configured to perform a wireless communication method recited in any of the foregoing described methods.

The present disclosure relates to a computer program product comprising a computer-readable program medium code stored thereupon, the code, when executed by a processor, causing the processor to implement a wireless communication method recited in any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
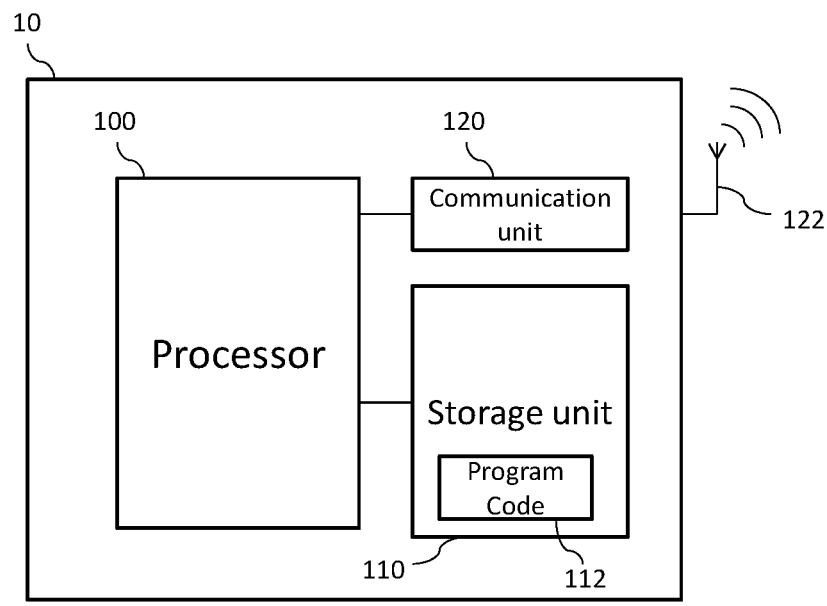
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
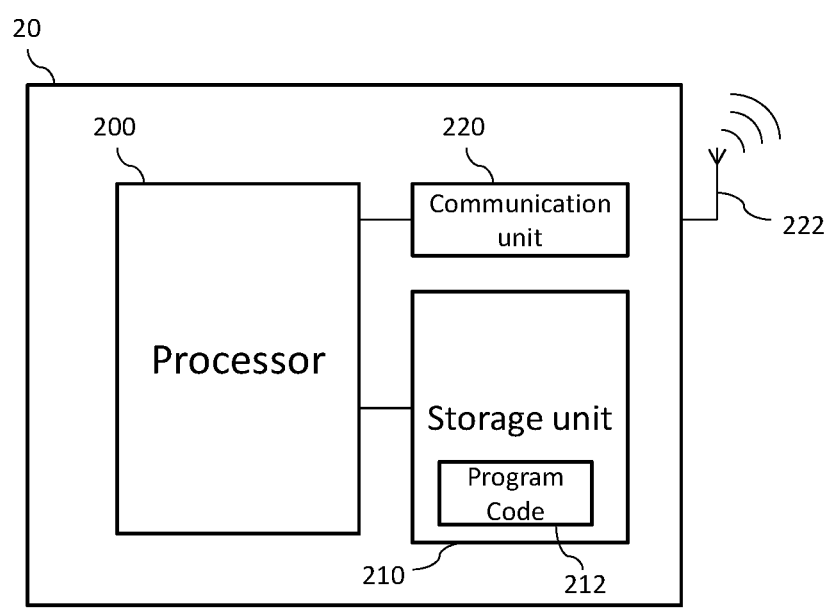
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In present disclosure, the BS may be a base station of a micro cell, a base station or a communication node of a small cell, a transmission node in a high-frequency communication system, a transmission node in an internet-of-thing (IoT) system, or a communication node in a satellite system.

In present disclosure, the UE may be a cell phone, a portable device, a vehicle or a node (e.g. terminal) in a communication system (e.g. the satellite system).

In present disclosure, a resource may be a frequency resource and/or a time resource.

In present disclosure, a resource set may comprise (e.g. represent) at least one resource.

In present disclosure, a frequency may be a frequency point, a frequency band, or a frequency resource.

In an embodiment, the BS may configure sounding reference signal (SRS) set(s) to the UE, wherein each of the configured SRS resource set(s) comprises at least one SRS resource. In an embodiment, based on the configuration received from the BS, the UE does not transmit and/or the BS does not receive the SRS in the SRS resource(s) of configured SRS resource set(s). In an embodiment, based on the configuration received from the BS, the UE transmits and/or the BS receives the SRS in the SRS resource(s) of configured SRS resource set(s). In an embodiment, the SRS resource(s) in each of the configured SRS resource set(s) is configured with resource parameter(s) (e.g. bit(s)) which indicate at least one resource in which the UE transmits and/or the BS receives the SRS and indicate at least one resource in which the UE does not transmit and/or the BS does not receive the SRS.

In an embodiment, when the UE switches the resource of transmitting the SRS to the SRS resource set comprising the SRS resource(s) in which the UE does not transmit and/or the BS does not receive the SRS, the UE stops counting the number $n_{SRS}$ of times of transmitting the SRS. That is, when the UE switches the resource of transmitting the SRS to the SRS resource set comprising the SRS resource(s) in which the UE does not transmit and/or the BS does not receive the SRS, the UE keeps the number $n_{SRS}$ of the SRS transmissions the same.

Figure 3A:
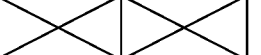
FIGS. 3A and 3B show examples of SRS resource sets according to an embodiment of the present disclosure.
Figure 3B:

FIGS. 3A and 3B show examples of SRS resource sets according to an embodiment of the present disclosure, wherein b is an index of a transmission bandwidth level of the SRS. In tables shown in FIGS. 3A and 3B shows the SRS resource sets corresponding to different transmission bandwidth levels (i.e. when b=0, 1, 2 or 3), each grid represents a SRS resource set and a number of each grid represents an index of corresponding SRS resource set. Note that, the SRS resource sets corresponding to the transmission bandwidth levels with index b=0, 1 and 2 are omitted for brevity. Based on the table shown in FIG. 3A, the UE switches the resource (set) of transmitting the SRS according to a sequential order of the indexes of the SRS resource set in the row of b=3. In the embodiment shown in FIG. 3B, the UE may switch the resource (set) of transmitting the SRS according to the sequential order which is the same with that shown in FIG.

3A. However, in the embodiment shown in FIG. 3B, the BS configures two SRS resource sets (i.e. the SRS resource sets with indexes 1 and 6 shown in FIG. 3A) in which the UE does not transmit and/or the BS does not receive the SRS. In this embodiment, when the UE switches the resource of transmitting the SRS to the SRS resource set with the indexes 1 and 6 shown in FIG. 3A, the UE stops counting the number $n_{SRS}$ of the SRS transmissions. Therefore, the indexes of the SRS resource sets are accordingly changed from those shown in FIG. 3A to those shown in FIG. 3B.

In an embodiment, when the UE switches the resource of transmitting the SRS to the SRS resource set comprising the SRS resource(s) in which the UE does not transmit and/or the BS does not receive the SRS, the UE keeps counting the number $n_{SRS}$ of times of transmitting the SRS. That is, when the UE switches the resource of transmitting the SRS to the SRS resource set comprising the SRS resource(s) in which the UE does not transmit and/or the BS does not receive the SRS, the UE increases the number $n_{SRS}$ of the SRS transmissions.

Figure 4A:
FIGS. 4A and 4B show examples of SRS resource sets according to an embodiment of the present disclosure.
Figure 4B:

FIGS. 4A and 4B show examples of SRS resource sets according to an embodiment of the present disclosure, wherein b is an index of a transmission bandwidth level of the SRS. In tables shown in FIGS. 4A and 4B shows the SRS resource sets corresponding to different transmission bandwidth levels (i.e. when b=0, 1, 2 or 3), each grid represents a SRS resource set and a number of each grid represents an index of corresponding SRS resource set. Note that, the SRS resource sets corresponding to the transmission bandwidth levels with index b=0, 1 and 2 are omitted for brevity. In the embodiment shown in FIG. 4B, the UE may switch the resource (set) of transmitting the SRS according to the sequential order which is the same with that shown in FIG. 4A. However, in the embodiment shown in FIG. 4B, the BS configures two SRS resource sets (i.e. the SRS resource sets with indexes 1 and 6 shown in FIG. 3A) in which the UE does not transmit and/or the BS does not receive the SRS. In this embodiment, when the UE switches the resource of transmitting the SRS to the SRS resource set with the indexes 1 and 6 shown in FIG. 3A, the UE keeps counting the number $n_{SRS}$ of the SRS transmissions. Therefore, the indexes of the SRS resource sets shown in FIGS. 4A and 4B are the same, except for the SRS resource sets configured not to be used for the SRS transmissions.

In an embodiment, a long-term evolution (LTE) network and a new radio (NR) network may perform dynamic spectrum sharing (DSS). When performing the DSS, the SRS for the LTE network and the SRS for the NR may be transmitted separately (e.g. on different symbols), to avoid the SRS for the LTE network and the SRS for the NR interfere with each other.

Figure 5:
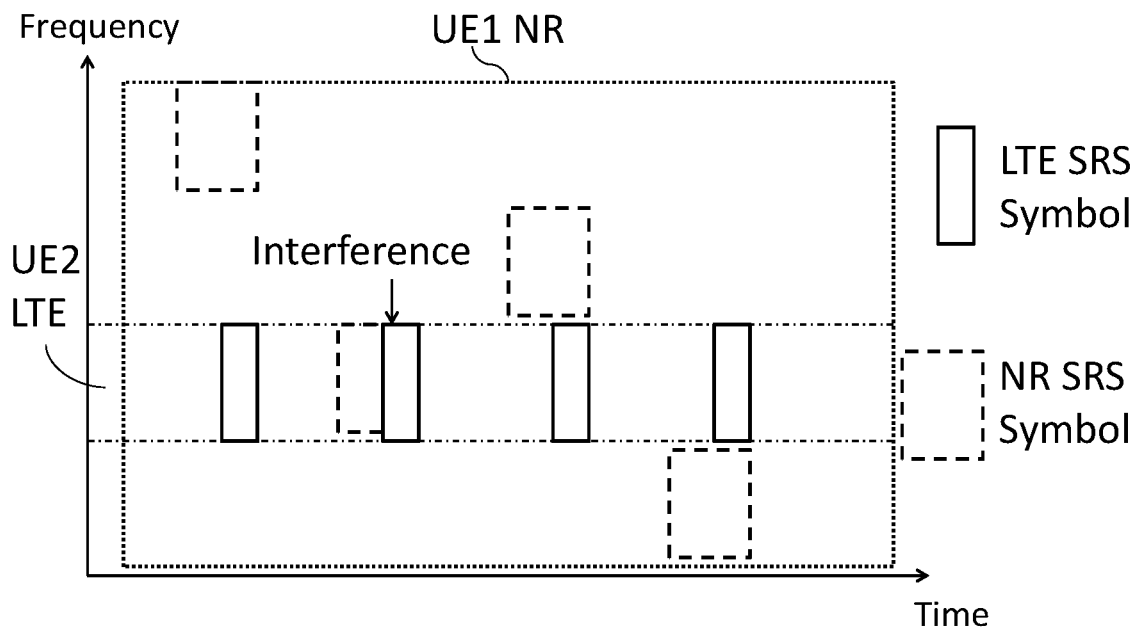
FIG. 5 shows an example of the DSS according to an embodiment of the present disclosure.

FIG. 5 shows an example of the DSS according to an embodiment of the present disclosure. In FIG. 5, a UE UE1 of the NR network may transmit NR SRS symbols (i.e. the symbols carrying the SRS for the NR network) and a UE UE2 transmits LTE SRS symbols (i.e. the symbols carrying the SRS for the LTE network). As shown in FIG. 5, the NR SRS symbol may interfere with the LTE SRS symbol when the UEs UE1 and UE2 utilize the same resource for transmitting the SRS. In order to avoid the interference, the NR symbols at which the interference occurs may not be configured with the SRS resource. If a sub-carrier spacing (SCS) of the NR is doubled a SCS of the LTE, two NR symbols overlapped with the LTE SRS symbol cannot be configured with the SRS resource. Under such a condition, the NR SRS capacity may be ineffective. This problem may be worsened, if the LTE network works in frequency division duplexing (FDD) mode because all of a LTE sub-frame at which the interference occurs cannot be utilized for transmitting the NR SRS.

In the present disclosure, the BS may configure certain SRS resource(s) in which the NR SRS is not transmitted (e.g. the SRS resource sets with the indexes 1 and 6 shown in FIG. 3A), so as to avoid the interference between the NR SRS and the LTE SRS. Under such a condition, the NR SRS is able to be configured on the last symbol of the LTE sub-frame. Therefore, the NR SRS capacity is also improved.

In an embodiment, a period $P_{NR}$ of transmitting the NR SRS may be different from a period $P_{LTE}$ of transmitting the LTE SRS. Thus, the SRS resource(s) in which the NR SRS is not transmitted may be configured based on a time parameter, e.g., related to a ratio between the periods $P_{LTE}$ of transmitting the LTE SRS and the period $P_{NR}$ of transmitting the NRE SRS. In an embodiment, the period $P_{LTE}$ of transmitting the LTE SRS may be N times of the period $P_{NR}$ of transmitting the NR SRS (e.g. $P_{LTE}=N \times P_{NR}$) and the SRS resource(s) in which the NR SRS is not transmitted may be configured every N periods $P_{NR}$ (i.e. $N \times P_{NR}$).

In an embodiment, the SRS resource in each of the SRS resource set may be configured with a dividing parameter k for improving coverage of the SRS. In this embodiment, the dividing parameter k is configured to determine a length of each SRS. For example, the number of physical resource blocks (PRBs) configured for each SRS may be $m_{SRS,b}$ and the length of the SRS may become $m_{SRS,b}$ PRBs divided by the dividing parameter k (i.e. $m_{SRS,b}$/k PRB(s)). Because the length of each SRS is acquired by dividing the $m_{SRS,b}$ PRBs by the dividing parameter k, the power of transmitting the SRS may be able to be increased. For example, if the power transmitting the SRS is originally a power P, the power of transmitting the SRS after adjusting the length of each SRS based on the dividing parameter K may become P×k. The coverage of the SRS is therefore improved.

In an embodiment, the UE may support 2 transmission (TX) to 4 receiving (RX) switching (2T4R). In an embodiment, the UE supporting the 2T4R may divide its antennas into 2 groups and each group of antennas supports 1T2R. Via measuring uplink signals, the BS is able to determine which group of antennas has improved configurations (e.g. performances) and may configure the UE, via a signaling, to transmit the UL signals on the group of antennas with better configurations. In an embodiment, methods of the BS configuring the UE, via the signaling, to transmit the UL signals on the group of antennas with improved configurations comprises:

1. An antenna port group association parameter is configured in the SRS resource set or the SRS resource configured by a higher layer signaling, wherein the antenna port group association parameter is configured to indicate an antenna port group APG0 or another antenna port group APG1. For example, the antenna port group APG0 and the antenna port group APG1 are configured with different antenna port group association parameters for indicating the antenna port group of transmitting aperiodic SRS(s), wherein each of the antenna port group association parameters is configured with corresponding aperiodic SRS-resource trigger. In an embodiment, the antenna port group association parameter is a resource identification (ID) of the SRS resource set. In an embodiment, the antenna port group association parameter associating an index of an antenna group to a resource ID of corresponding SRS resource set. In an embodiment, the index of the antenna port group is associated with the resource ID of the SRS resource in the periodic SRS resource set.

In an embodiment, the UE supporting the 2T4R is configured with a periodic SRS resource set, wherein the periodic SRS resource set comprises 2 resources RES0 and RES1 and each of the resources RES0 and RES1 is consisting of 2 SRS ports. In addition, the UE supporting 2T4R is further configured with 2 aperiodic SRS resource sets SRS-RS1 and SRS_RS2, wherein each of the aperiodic SRS resource sets SRS-RS1 and SRS-RS2 comprises 1 SRS resource which consists of 1 SRS port and is configured with an antenna port group association parameter. In an embodiment, the antenna port group association parameters in the SRS resource of the aperiodic SRS resource sets SRS-RS1 and SRS-RS2 may be associated with resource IDs of the resources RES0 and RES1 in the periodic SRS. As a result, a function of dynamically selecting antenna port group via through downlink control information can be achieved.

In an embodiment, the above embodiment related to the UE supporting the 2T4R may be also applied to the UE supporting 4 TX 8 RX switching (4T8R). For example, the UE supporting 4T8R may divide its antennas into 2 groups of antennas and each group of antennas support the 2T4R.

In an embodiment, the BS may configure the dividing parameter k via an RRC signaling.

In an embodiment, the resources (e.g. physical resource blocks (PRBs) configured for each SRS may be divided into a plurality of resource segments by the dividing parameter k and the corresponding SRS is transmitted in one of the plurality of resource segments. In an embodiment, the resource segment used for transmitting the SRS is predefined. In an embodiment, the resource segment used for transmitting the SRS may be determined based on an offset parameter configured by the BS. In an embodiment, the offset parameter is configured via an RRC signaling.

Figure 6A:
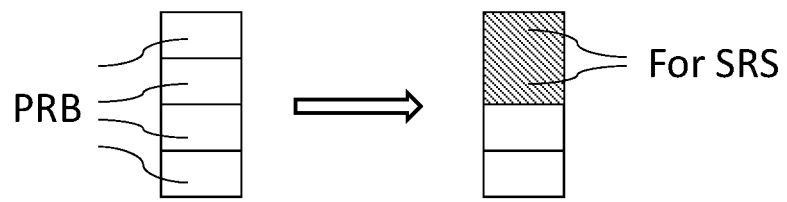
FIGS. 6A, 6B and 6C show examples of the SRS transmission according to an embodiment of the present disclosure.

FIG. 6A shows an example of the SRS transmission according to an embodiment of the present disclosure. In FIG. 6A, each SRS is configured with 4 PRBs and the dividing parameter k is 2. Thus, the length of each SRS becomes 2 (i.e. 4/2) PRBs. In FIG. 6A, the 2 PRBs configured for transmitting the SRS is the first and second PRBs (from top to bottom).

Figure 6B:
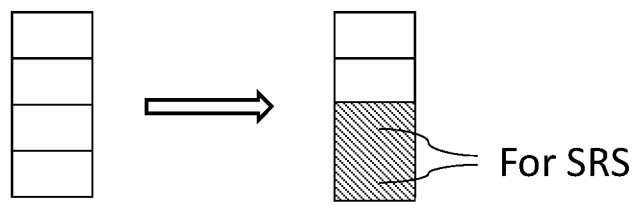

FIG. 6B shows an example of the SRS transmission according to an embodiment of the present disclosure. Similar to FIG. 6A, each SRS is configured with 4 PRBs and the dividing parameter k is 2 in FIG. 6B. Thus, the length of each SRS is also 2 PRBs. In FIG. 6B, the 2 PRBs configured for transmitting the SRS is last two PRBs (from top to bottom).

Figure 6C:
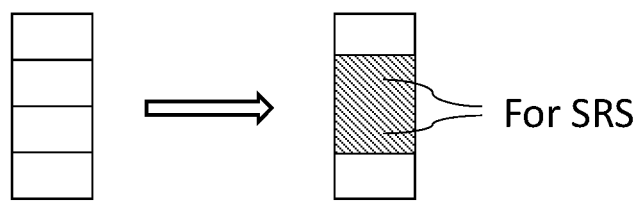

FIG. 6C shows an example of the SRS transmission according to an embodiment of the present disclosure. Similar to FIGS. 6A and 6B, each SRS is configured with 4 PRBs and the dividing parameter k is 2 in FIG. 6C. Thus, the length of each SRS is also 2 PRBs. In FIG. 6C, the 2 PRBs configured for transmitting the SRS is the second and third PRBs (from top to bottom).

Note that, the RSBs used for transmitting the SRS may be determined based on the offset parameter configured by the BS. For example, the BS may change the RSBs used for transmitting the SRS among those shown in FIGS. 6A, 6B and 6C by configuring the offset parameter. In an embodiment, the BS may configure the offset parameter with a value 0 to indicate the RSBs used for transmitting the SRS is those shown in FIG. 6A. In an embodiment, the BS may configure the offset parameter with a value 1 to indicate the RSBs used for transmitting the SRS is those shown in FIG. 6B. In an embodiment, the BS may configure the offset parameter with a value 2 to indicate the RSBs used for transmitting the SRS is those shown in FIG. 6C.

In the present disclosure exemplary reference is made to the 5th generation mobile communication system (5G). However it is understood by the skilled person that the present disclosure is not restricted to 5G (or any other mobile communication standard as LTE) but also covers other standards without departing from the present disclosure.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless network node, the wireless communication method comprising:
   configuring, to a wireless terminal, at least one first sounding reference signal (SRS) resource set, and
   receiving, from the wireless terminal, at least one first SRS based on the at least one SRS resource set,
   wherein each of the at least one SRS resource set comprises at least one SRS resource,
   wherein the at least one SRS resource comprises at least one second SRS resource in which the wireless network node does not receive the at least one first SRS from the wireless terminal,
   wherein the wireless network node does not receive the at least one first SRS from the wireless terminal in the at least one second SRS resource based on at least one time parameter,
   wherein the at least one time parameter comprises a period and the wireless network node does not receive the at least one first SRS from the wireless terminal in the at least one second SRS resource every the period, and
   wherein the period is determined based on a period of transmitting the at least one first SRS for a first network and a period of transmitting at least one second SRS for a second network.

2. The wireless communication method of claim 1, wherein the at least one SRS resource comprises at least one first SRS resource in which the wireless network node receives the at least one first SRS from the wireless terminal.

3. The wireless communication method of claim 1, wherein one of the at least one second SRS resource is selected for receiving the at least one first SRS and the number of times of SRS transmissions increases or keeps the same.

4. The wireless communication method of claim 1, wherein the at least one SRS resource comprises at least one third SRS resource which comprises at least one resource parameter,
   wherein the at least one resource parameter indicates at least one resource in which the wireless network node receives the at least one first SRS from the wireless terminal and at least one resource in which the wireless network node does not receive the at least one first SRS from the wireless terminal.

5. The wireless communication method of claim 1, wherein the at least one SRS resource comprises a dividing parameter for determining a length for each of the at least one first SRS,
   wherein the length of each of the at least one first SRS is determined by dividing, by the dividing parameter, at least one physical resource block (PRB) configured for each of the at least one first SRS into a plurality of PRB segments,
   wherein the at least one first SRS is in one of the plurality of PRB segments, and wherein the at least one SRS resource comprises an offset parameter configured to indicate the one of the plurality of PRB segments for each of the at least one first SRS.

6. The wireless communication method of claim 5, wherein the offset parameter is configured via a radio resource control (RRC) signaling, and
wherein the dividing parameter is configured via an RRC signaling.

7. A wireless communication method for use in a wireless terminal, the wireless communication method comprising:
receiving, from a wireless network node, a configuration of at least one first sounding reference signal (SRS) resource set, and
transmitting, to the wireless network node, at least one first SRS based on the at least one SRS resource set,
wherein each of the at least one SRS resource set comprises at least one SRS resource,
wherein the at least one SRS resource comprises at least one second SRS resource in which the wireless terminal does not transmit the at least one first SRS to the wireless network node,
wherein the wireless terminal does not transmit the at least one first SRS to the wireless network node in the at least one second SRS resource based on at least one time parameter,
wherein the at least one time parameter comprises a period and the wireless terminal does not transmit the at least one first SRS to the wireless network node in the at least one second SRS resource every the period, and
wherein the period is determined based on a period of transmitting the at least one first SRS for a first network and a period of transmitting at least one second SRS for a second network.

8. The wireless communication method of claim 7, wherein the at least one SRS resource comprises at least one first SRS resource in which the wireless terminal transmits the at least one first SRS to the wireless network node.

9. The wireless communication method of claim 7, wherein one of the at least one second SRS resource is selected for transmitting the at least one first SRS and the number of times of SRS transmissions increases or keeps the same.

10. The wireless communication method of claim 7, wherein the at least one SRS resource comprises at least one third SRS resource which comprises at least one resource parameter,
wherein the at least one resource parameter indicates at least one resource in which the wireless network node receives the at least one first SRS from the wireless terminal and at least one resource in which the wireless network node does not receive the at least one first SRS from the wireless terminal.

11. The wireless communication method of claim 7, wherein the at least one SRS resource comprises a dividing parameter for determining a length of each of the at least one first SRS,
wherein the length of each of the at least one first SRS is determined by dividing, by the dividing parameter, at least one physical resource block (PRB) configured for each of the at least one first SRS into a plurality of PRB segments,
wherein the at least one first SRS is in one of the plurality of PRB segments, and
wherein the at least one SRS resource comprises an offset parameter configured to indicate the one of the plurality of PRB segments for each of the at least one first SRS.

12. The wireless communication method of claim 11, wherein the offset parameter is configured via a radio resource control (RRC) signaling, and
wherein the dividing parameter is configured via an RRC signaling.

13. A wireless network node, comprising:
a processor, configured to configure, to a wireless terminal, at least one first sounding reference signal (SRS) resource set, and
a communication unit, configured to receive, from the wireless terminal, at least one first SRS based on the at least one SRS resource set,
wherein each of the at least one SRS resource set comprises at least one SRS resource,
wherein the at least one SRS resource comprises at least one second SRS resource in which the wireless network node does not receive the at least one first SRS from the wireless terminal,
wherein the wireless network node does not receive the at least one first SRS from the wireless terminal in the at least one second SRS resource based on at least one time parameter,
wherein the at least one time parameter comprises a period and the wireless network node does not receive the at least one first SRS from the wireless terminal in the at least one second SRS resource every the period, and
wherein the period is determined based on a period of transmitting the at least one first SRS for a first network and a period of transmitting at least one second SRS for a second network.

14. A wireless terminal, comprising:
a communication unit, configured to:
receive, from a wireless network node, a configuration of at least one first sounding reference signal (SRS) resource set, and
transmit, to the wireless network node, at least one first SRS based on the at least one SRS resource set,
wherein each of the at least one SRS resource set comprises at least one SRS resource,
wherein the at least one SRS resource comprises at least one second SRS resource in which the wireless terminal does not transmit the at least one first SRS to the wireless network node,
wherein the wireless terminal does not transmit the at least one first SRS to the wireless network node in the at least one second SRS resource based on at least one time parameter,
wherein the at least one time parameter comprises a period and the wireless terminal does not transmit the at least one first SRS to the wireless network node in the at least one second SRS resource every the period, and
wherein the period is determined based on a period of transmitting the at least one first SRS for a first network and a period of transmitting at least one second SRS for a second network.

* * * * *